(12) United States Patent
Fukushima

(10) Patent No.: US 12,237,523 B2
(45) Date of Patent: Feb. 25, 2025

(54) ELECTROCHEMICAL CELL AND ELECTROCHEMICAL CELL MODULE

(71) Applicant: KYOCERA CORPORATION, Kyoto (JP)

(72) Inventor: Takaaki Fukushima, Daito (JP)

(73) Assignee: KYOCERA CORPORATION, Kyoto (JP)

( * ) Notice: Subject to any disclaimer, the term of this patent is extended or adjusted under 35 U.S.C. 154(b) by 504 days.

(21) Appl. No.: 17/630,487

(22) PCT Filed: Jul. 28, 2020

(86) PCT No.: PCT/JP2020/028862
§ 371 (c)(1),
(2) Date: Jan. 26, 2022

(87) PCT Pub. No.: WO2021/020383
PCT Pub. Date: Feb. 4, 2021

(65) Prior Publication Data
US 2022/0255171 A1 Aug. 11, 2022

(30) Foreign Application Priority Data
Jul. 29, 2019 (JP) .................................. 2019-138989

(51) Int. Cl.
*H01M 50/00* (2021.01)
*H01M 50/202* (2021.01)
*H01M 50/209* (2021.01)

(52) U.S. Cl.
CPC ....... *H01M 50/209* (2021.01); *H01M 50/202* (2021.01)

(58) Field of Classification Search
CPC ... H01M 10/42; H01M 50/209; H01M 50/202
See application file for complete search history.

(56) References Cited

U.S. PATENT DOCUMENTS

2014/0170468 A1    6/2014  Sasaoka
2015/0288037 A1*  10/2015  White ............... H01M 10/4207
                                                    429/50

FOREIGN PATENT DOCUMENTS

| CN | 103650228 A | 3/2014 |
| JP | 2000285967 A | 10/2000 |
| JP | 2018139199 A | 9/2018 |
| JP | 201921382 A | 2/2019 |

(Continued)

OTHER PUBLICATIONS

Allen et al., Rechargeable Battery With Ionic Liquid Electrolyte and Electrode Pressure, Mar. 2020, See the Abstract. (Year: 2020).*

*Primary Examiner* — Niki Bakhtiari
*Assistant Examiner* — Monique M Wills
(74) *Attorney, Agent, or Firm* — HAUPTMAN HAM, LLP

(57) ABSTRACT

An electrochemical cell includes a first unit cell including a first electricity generator and a first casing containing the first electricity generator, a second unit cell including a second electricity generator and a second casing containing the second electricity generator, and an outer container containing the first unit cell and the second unit cell. The electrochemical cell further includes a liquid layer between the first casing and the second casing. The liquid layer is in direct contact with the first casing and the second casing.

4 Claims, 9 Drawing Sheets

(56) References Cited

FOREIGN PATENT DOCUMENTS

| JP | 201933043 A | 2/2019 | |
|---|---|---|---|
| WO | 2013008321 A1 | 1/2013 | |
| WO | WO-2020047210 A1 * | 3/2020 | ........ H01M 10/0468 |

* cited by examiner

ELECTROCHEMICAL CELL AND ELECTROCHEMICAL CELL MODULE

RELATED APPLICATIONS

The present application is a National Phase of International Application Number PCT/JP2020/028862, filed Jul. 28, 2020, which claims priority to Japanese Application No. 2019-138989, filed Jul. 29, 2019.

FIELD

The present disclosure relates to an electrochemical cell and an electrochemical cell module.

BACKGROUND

A known electrochemical cell module is described in, for example, Patent Literature 1. The electrochemical cell module described in Patent Literature 1 allows a uniform and stable operation of electrochemical cells and reduces defects such as decreased capacity and gas generation.

CITATION LIST

Patent Literature

Patent Literature 1: Japanese Unexamined Patent Application Publication No. 2019-21382

BRIEF SUMMARY

An electrochemical cell according to an aspect of the present disclosure includes a first unit cell, a second unit cell, an outer container, and a liquid layer. The first unit cell includes a first electricity generator and a first casing containing the first electricity generator. The second unit cell includes a second electricity generator and a second casing containing the second electricity generator. The outer container contains the first unit cell and the second unit cell. The liquid layer is located between the first casing and the second casing. The liquid layer is in direct contact with the first casing and the second casing.

An electrochemical cell according to another aspect of the present disclosure includes a first unit cell, a second unit cell, an outer container, and an electrolyte. The first unit cell includes a first electricity generator and a first casing containing the first electricity generator. The second unit cell includes a second electricity generator and a second casing containing the second electricity generator. The outer container contains the first unit cell and the second unit cell. The electrolyte is located inside the first casing, inside the second casing, and between the first casing and the second casing.

An electrochemical cell module according to another aspect of the present disclosure includes the electrochemical cell according to one of the above aspects, a housing containing the electrochemical cell, and a pressurizing unit that applies pressure to the first unit cell and the second unit cell.

An electrochemical cell module according to another aspect of the present disclosure includes the electrochemical cell according to one of the above aspects, and a housing containing the electrochemical cell. The housing applies pressure to the first unit cell and the second unit cell.

BRIEF DESCRIPTION OF DRAWINGS

The objects, features, and advantages of the present disclosure will become more apparent from the following detailed description and the drawings.

DETAILED DESCRIPTION

Figure 1:
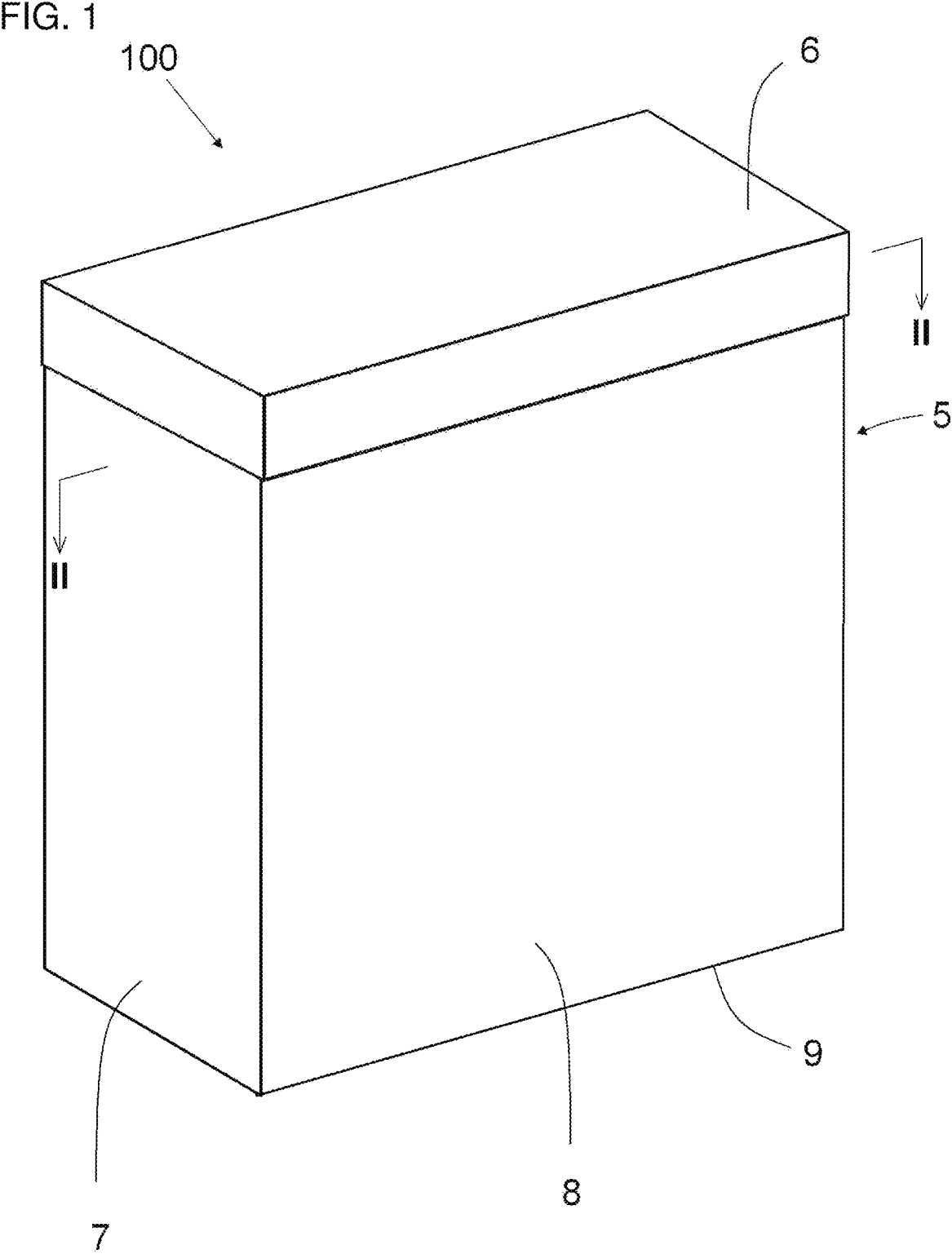
FIG. 1 is a perspective view of an electrochemical cell module.
Figure 2:
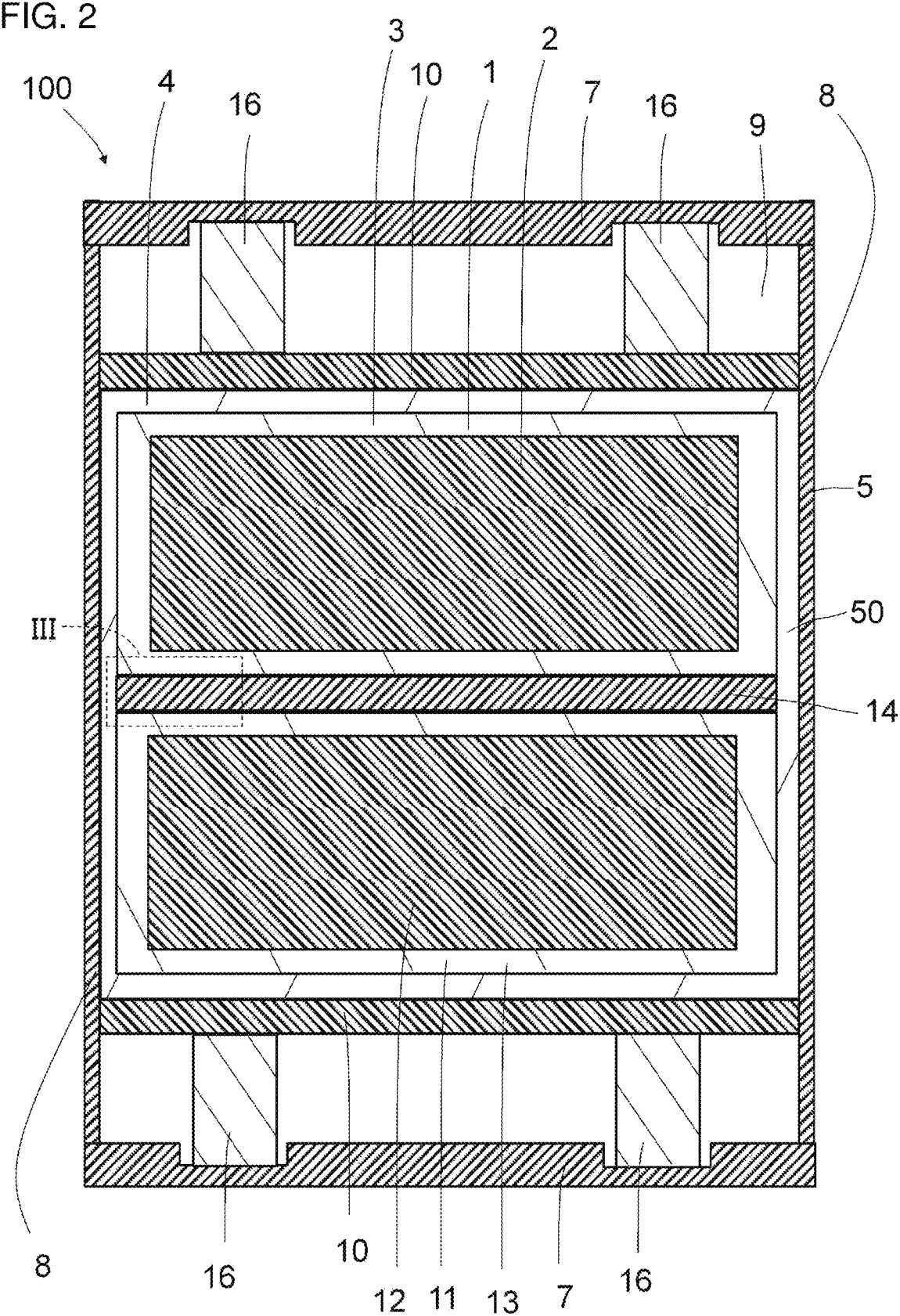
FIG. 2 is a cross-sectional view taken along line II-II in FIG. 1.

An electrochemical cell module 100 will now be described in detail with reference to FIGS. 1 and 2. As shown in FIGS. 1 and 2, the electrochemical cell module 100 includes a housing 5 and an electrochemical cell 50 located in the housing 5. The electrochemical cell 50 functions as a battery in the electrochemical cell module 100. The electrochemical cell 50 includes, for example, a lithium-ion battery. The electrochemical cell 50 includes an outer container 4, a first unit cell 1 and a second unit cell 11 in the outer container 4, and a liquid layer 14 between the first unit cell 1 and the second unit cell 11. The first unit cell 1 and the second unit cell 11 may be, for example, held with their main surfaces pressed against each other. The first unit cell 1 and the second unit cell 11 may be, for example, stacked on each other in the electrochemical cell 50. The electrochemical cell 50 is, for example, plate-like. The electrochemical cell 50 electrically connected to an external device can supply electricity to the external device.

The first unit cell 1 includes a first electricity generator 2, a first casing 3 containing the first electricity generator 2, and first terminals. The first unit cell 1 is the smallest unit member functioning as a battery in the electrochemical cell 50. The first unit cell 1 is, for example, a plate with main surfaces. The first unit cell 1 may be, for example, circular. The first unit cell 1 may also be, for example, rectangular as viewed in a direction perpendicular to the main surfaces of the first unit cell 1. The first unit cell 1 may have, for example, a length of 50 to 500 mm, a width of 50 to 300 mm, and a thickness of 0.1 to 2 mm.

The first electricity generator 2 charges and discharges through an electrochemical reaction. The first electricity generator 2 has, for example, a positive electrode, a negative electrode, and a separator between the positive electrode and the negative electrode. The first electricity generator 2 may exchange cations and anions between the positive electrode and the negative electrode through the separator. The first electricity generator 2 with the positive electrode and the negative electrode electrically connected to an external device can supply electricity to the external device.

The first electricity generator 2 is, for example, a stack of the positive electrode, the separator, and the negative electrode. The first electricity generator 2 is, for example, plate-like. The first electricity generator 2 has, for example, the positive electrode, the separator, and the negative electrode stacked in the thickness direction of the plate.

The positive electrode and the negative electrode are, for example, electrochemically active. The positive electrode and the negative electrode may include, for example, an active material and an electrolyte. The electrolyte may be, for example, a solvent containing salt or a solvent mixture containing salt.

More specifically, the positive electrode and the negative electrode may include, for example, the active material and the electrolyte described in U.S. Provisional Patent Application No. 61/787,382 entitled Semi-Solid Electrodes Having High Rate Capability and U.S. Provisional Patent Application No. 61/787,372 entitled Asymmetric Battery Having a Semi-Solid Cathode and High Energy Density Anode. The positive electrode and the negative electrode may include, for example, an additive.

The separator separates the positive electrode and the negative electrode without a short-circuit between them. For example, the separator may have pores for passage of cations and anions. The separator may be formed from, for example, a porous insulating material. More specifically, the separator may be formed from, for example, a polyolefin or polyvinyl chloride.

The plate-like first electricity generator 2 may have, for example, a length of 50 to 500 mm, a width of 50 to 300 mm, and a thickness of 0.1 to 2.0 mm.

The first casing 3 has a space for containing the first electricity generator 2. The first casing 3 protects the first electricity generator 2 from the external environment. More specifically, the first casing 3 electrically insulates the first electricity generator 2 from the external environment. The first casing 3 entirely covers the first electricity generator 2.

The first casing 3 is, for example, a flat bag. The first casing 3 is formed from, for example, a laminated film shaped into a flat bag. The first casing 3 may be formed by, for example, welding two laminated films together. The first casing 3 may be, for example, rectangular as viewed in the stacking direction of the positive electrode, the separator, and the negative electrode.

The first casing 3 includes, for example, an insulating material. The first casing 3 protects the first electricity generator 2 from the external environment with no short-circuit forming between the external environment and the first electricity generator 2. The first casing 3 includes, for example, a resin material. More specifically, the resin material may be, for example, polyethylene terephthalate or polyethylene.

The first casing 3 may be, for example, multilayered. More specifically, the first casing 3 includes, for example, a thermally adhesive resin material and a heat-resistant resin material. More specifically, the thermally adhesive resin material melts at temperatures lower than 150° C. More specifically, the heat-resistant resin material melts at 150 to 300° C. The heat-resistant resin material may include, for example, polyethylene terephthalate or polyethylene naphthalate. The thermally adhesive resin material may be, for example, polyethylene or polypropylene.

The first terminals electrically connect the first electricity generator 2 to an external device. The first terminals are, for example, plate-like. More specifically, the first terminals are, for example, quadrangular as viewed in the stacking direction of the first unit cell 1 and the second unit cell 11. The first terminals may be, for example, rectangular. The rectangular first terminals may include, for example, long sides and short sides.

The first terminals are in contact with the first electricity generator 2 as viewed in the stacking direction of the first unit cell 1 and the second unit cell 11. The first terminals are on one peripheral side of the first electricity generator 2 as viewed in the stacking direction of the first unit cell 1 and the second unit cell 11. The first terminals protrude outward from the first unit cell 1 for electrical connection to the external device. The first terminals electrically connect to external connection terminals outside the first unit cell 1.

The first terminals include, for example, a conductive material. The first terminals may include, for example, a metal material. More specifically, the metal material may be, for example, aluminum or copper. The plate-like first terminals may have, for example, a length of 30 to 100 mm, a width of 10 to 100 mm, and a thickness of 0.1 to 0.5 mm.

The second unit cell 11 is rechargeable, similarly to the first unit cell 1. In the electrochemical cell 50, the first unit cell 1 and the second unit cell 11 are connected to each other in parallel. This may increase the capacity of the electrochemical cell 50. The first unit cell 1 and the second unit cell 11 may also be connected to each other in series. This may increase the voltage across the electrochemical cell 50.

The second unit cell 11 and the first unit cell 1 are, for example, stacked on each other in the outer container 4. The second unit cell 11 includes a second electricity generator 12, a second casing 13, and second terminals. The second unit cell 11 has the same shape as the first unit cell 1 in the electrochemical cell 50. The second unit cell 11 may be shaped, for example, differently from the first unit cell 1. The second unit cell 11 is stacked on the first unit cell 1 with their outer peripheries aligned with each other in the electrochemical cell 50. The second unit cell 11 may also be stacked on the first unit cell 1 without their outer peripheries being aligned with each other.

The first electricity generator 2 and the second electricity generator 12 are stacked on each other with their long sides aligned and their short sides aligned as viewed in the stacking direction of the first unit cell 1 and the second unit cell 11. The first casing 3 and the second casing 13 are stacked on each other with their long sides aligned and their short sides aligned as viewed in the stacking direction of the first unit cell 1 and the second unit cell 11. The first terminals and the second terminals are stacked on one another with their long sides aligned and their short sides aligned as viewed in the stacking direction of the first unit cell 1 and the second unit cell 11.

The second electricity generator 12 may be formed from, for example, the material included in the first electricity generator 2. More specifically, the second electricity generator 12 may be formed from the same material as for the first electricity generator 2. The second electricity generator 12 may also be formed from, for example, a material different from the material for the first electricity generator 2.

The second casing 13 has the same shape as the first casing 3. The second casing 13 may be shaped, for example, differently from the first casing 3. The second casing 13 may be formed from, for example, the material included in the first casing 3. More specifically, the second casing 13 may be formed from the same material as for the first casing 3. The second casing 13 may also be formed from, for example, a material different from the material for the first casing 3.

The second terminals have the same shape as the first terminals. The second terminals may be shaped, for example, differently from the first terminals. The second terminals may be formed from, for example, the material included in the first terminals. More specifically, the second terminals may be formed from the same material as for the first terminals. The second terminals may also be formed from, for example, a material different from the material for the first terminals.

The second unit cell 11 may have, for example, the same dimensions as the first unit cell 1. The second unit cell 11 may also have, for example, dimensions different from the dimensions of the first unit cell 1.

The outer container 4 has a space for containing the first unit cell 1 and the second unit cell 11. The outer container 4 protects the first unit cell 1 and the second unit cell 11 from the external environment. More specifically, the outer container 4 protects the first unit cell 1 and the second unit cell 11 from oxygen and moisture contained in the atmosphere.

The outer container 4 may be, for example, cylindrical. The outer container 4 may also be, for example, a rectangular prism. The outer container 4 may also be, for example, a bag. The outer container 4 is formed from, for example, a single member shaped into a bag. The outer container 4 may also be formed by, for example, welding two members together. The outer container 4 may be, for example, rectangular as viewed in the stacking direction of the first unit cell 1 and the second unit cell 11. The outer container 4 may transmit external pressure applied through a pressurizing unit to the inside as described later.

The outer container 4 includes, for example, an insulating material. The outer container 4 thus reduces the likelihood of a short-circuit forming between the external environment and the first unit cell 1 or the second unit cell 11 and protects the first unit cell 1 and the second unit cell 11 from the external environment. The insulating material may be, for example, a resin material. More specifically, the resin material may be, for example, polyethylene terephthalate or polyethylene.

The outer container 4 may be, for example, multilayered. The outer container 4 may also be, for example, three-layered. More specifically, the outer container 4 may include, for example, a first insulating layer, a moisture-proof layer, and a second insulating layer. The moisture-proof layer is, for example, located between the first insulating layer and the second insulating layer. More specifically, the moisture-proof layer may also be covered with, for example, the first insulating layer and the second insulating layer. The moisture-proof layer may also be in direct contact with, for example, the first insulating layer and the second insulating layer.

The first insulating layer includes, for example, a resin material. More specifically, the resin material may be, for example, polyethylene terephthalate or polyethylene naphthalate. The moisture-proof layer prevents oxygen and moisture penetrating the first insulating layer from reaching the second insulating layer. The moisture-proof layer includes, for example, a metal material. More specifically, the metal material may be, for example, aluminum or copper. The second insulating layer includes, for example, a resin material. More specifically, the resin material may be, for example, polyethylene or polypropylene.

The outer container 4 including the moisture-proof layer protects the first unit cell 1 and the second unit cell 11 from oxygen and moisture penetrating the first insulating layer. The first unit cell 1 and the second unit cell 11 are thus less likely to deteriorate. The electrochemical cell 50 is thus less likely to be damaged.

The rectangular outer container 4 as viewed in the stacking direction of the first unit cell 1 and the second unit cell 11 may have, for example, a length of 50 to 600 mm, a width of 50 to 400 mm, and a thickness of 1 to 50 mm.

Known unit cells may have varying thicknesses due to manufacturing errors. In addition, repeated charging and discharging reactions in an electrochemical cell module may expand and contract its positive electrodes and negative electrodes, and may generate gas, causing the unit cells to have varying thicknesses. Such unit cells cannot receive pressure uniformly, possibly increasing the interface resistance between the electricity generators. The increased interface resistance may disable uniform charging and discharging reactions in the unit cells, possibly causing the unit cells to deteriorate further.

The liquid layer 14 transmits external pressure to the first unit cell 1 and the second unit cell 11. The liquid layer 14 is located at least between the first unit cell 1 and the second unit cell 11. The liquid layer 14 is in direct contact with the first unit cell 1 and the second unit cell 11. More specifically, the liquid layer 14 is located between the surface of the first casing 3 in the first unit cell 1 and the surface of the second casing 13 in the second unit cell 11 facing the first casing 3. The liquid layer 14 may fill, for example, the space between the first casing 3 in the first unit cell 1 and the second casing 13 in the second unit cell 11 facing the first casing 3. Although the first unit cell 1 and the second unit cell 11 with varying thicknesses may have recesses on their surfaces, the liquid layer 14 may be located inside the recesses to allow pressure to be applied uniformly to the main surfaces of the first unit cell 1 and the second unit cell 11. The main surfaces of the first unit cell 1 and the second unit cell 11 stacked on each other in the electrochemical cell 50 extend in a direction intersecting the stacking direction. The main surfaces of the first unit cell 1 and the second unit cell 11 may include the surfaces of the first casing 3 in the first unit cell 1 and the second casing 13 in the second unit cell 11 facing each other with the liquid layer 14 between them. This structure allows the first unit cell 1 and the second unit cell 11 to perform charging and discharging reactions without varying interface resistances. The first unit cell 1 and the second unit cell 11 are thus less likely to deteriorate. The electrochemical cell 50 may thus have a longer service life.

The liquid layer 14 is a layer of liquid material located between the first casing 3 and the second casing 13 and in direct contact with the first casing 3 and the second casing 13.

The liquid layer 14 may include, for example, an organic solvent. More specifically, the organic solvent may be, for example, ethylene carbonate or γ-butyrolactone. The liquid layer 14 may also include a flowable low-molecular-weight polymeric material. More specifically, the flowable polymeric material may be, for example, polyethylene oxide. The liquid layer 14 may be formed from a silicon-based polymer material. The silicon-based polymer material may be, for example, silicone.

The liquid layer 14 may be formed from a water-absorbent material. Such an absorbent material absorbs external moisture entering the outer container 4 and reduces moisture entering the first unit cell 1 and the second unit cell 11. The electrochemical cell 50 may thus have a longer service life. The water-absorbent material may be, for example, a water-absorbent polymer. The water-absorbent polymer may be, for example, polyacrylonitrile.

Figure 3:
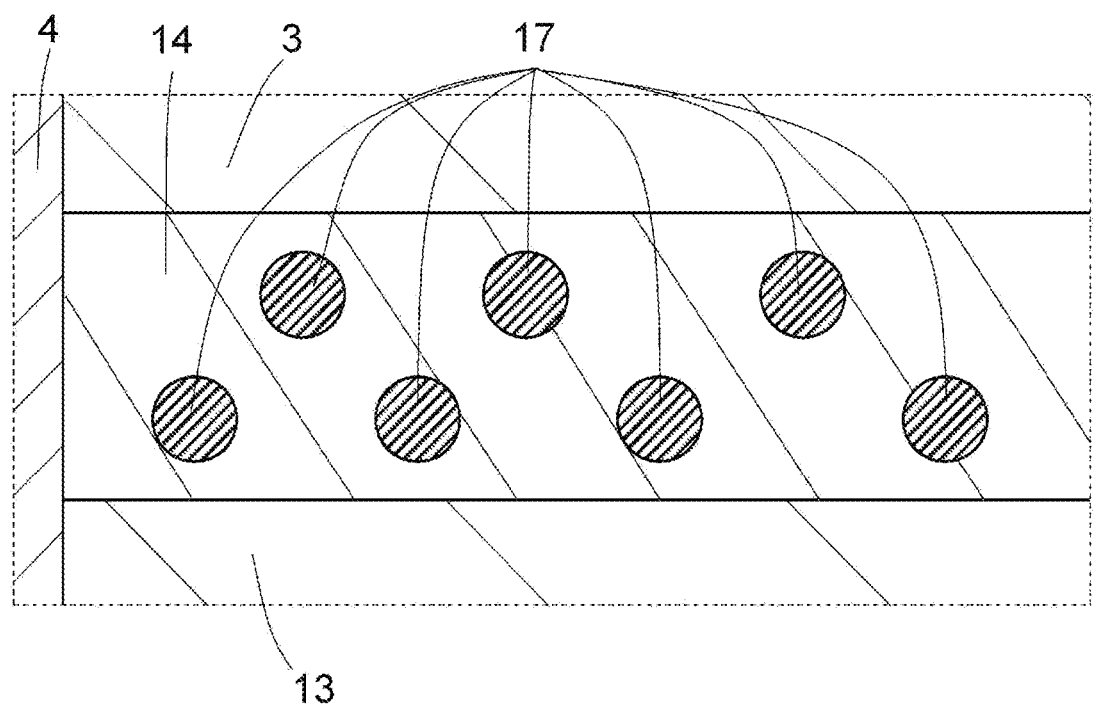
FIG. 3 is an enlarged view of area III in FIG. 2.

The liquid layer 14 may include an inorganic material. As shown in FIG. 3, the inorganic material may be dispersed as a filler 17 in the liquid material for the liquid layer 14.

The inorganic material may include, for example, a porous filler 17. The porous filler 17 may be, for example, zeolite. Zeolite can absorb any moisture entering the outer container 4. The electrochemical cell 50 can thus have a longer service life. The liquid layer 14 may include, for example, 0.1 to 10% by weight of inorganic material.

The inorganic material may be, for example, a metal filler 17. The metal filler 17 may react with, for example, water and oxygen. More specifically, the metal filler 17 may be, for example, iron, copper, or aluminum. Water and oxygen entering the outer container 4 may react with the metal filler 17 and thus be less likely to enter the first unit cell 1 and the second unit cell 11. The electrochemical cell 50 may thus have a longer service life. The liquid layer 14 may have a thickness of, for example, 1 to 100 μm.

When the first unit cell 1 and the second unit cell 11 are stacked on each other, the liquid layer 14 may be, for example, placed on the first casing 3 of the first unit cell 1, and then the second casing 13 may be placed on the liquid layer 14. The liquid layer 14 may also be, for example, placed on the second casing 13 of the second unit cell 11, and then the first casing 3 may be placed on the liquid layer 14. The liquid layer 14 may be, for example, placed between the first unit cell 1 and the second unit cell 11 when the first unit cell 1 and the second unit cell 11 are placed in the outer container 4 in the electrochemical cell 50 and the outer container 4 is closed.

Figure 4:
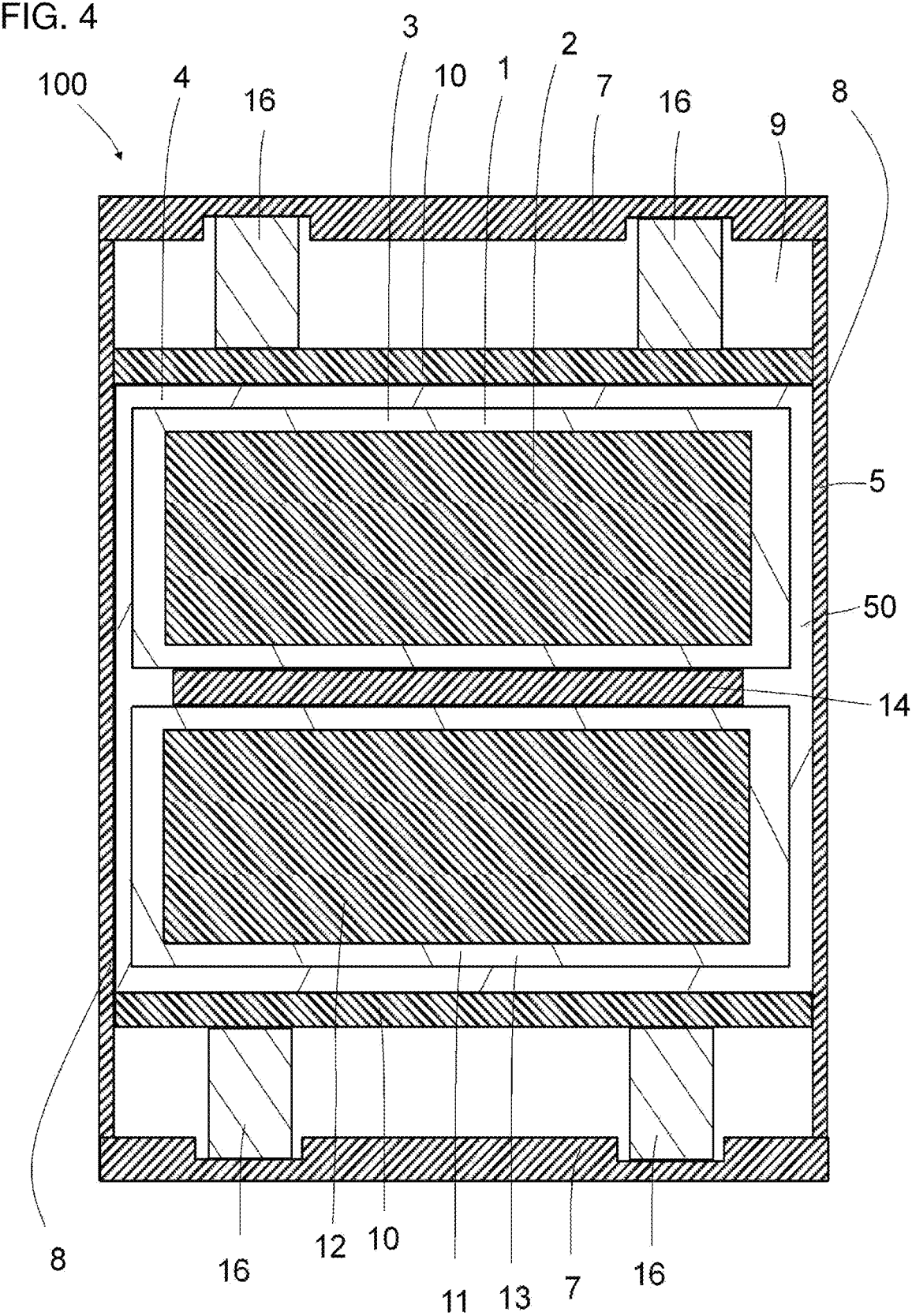
FIG. 4 is a cross-sectional view of another electrochemical cell module corresponding to FIG. 2.

FIG. 4 is a cross-sectional view of another electrochemical cell module corresponding to FIG. 2. As viewed in the stacking direction of the first unit cell 1 and the second unit cell 11, the liquid layer 14 may be located, for example, in an area of overlap between the first electricity generator 2 and the second electricity generator 12. This structure may easily apply pressure uniformly to the first electricity generator 2 and the second electricity generator 12. The electrochemical cell 50 is thus less likely to deteriorate.

The liquid layer 14 may be formed from, for example, a material having higher heat-conductivity than an electrolyte used in the first electricity generator 2 and the second electricity generator 12. This may facilitate transfer of heat generated in the first unit cell 1 and the second unit cell 11 to the liquid layer 14. The first unit cell 1 and the second unit cell 11 may thus be less likely to accumulate heat. The electrochemical cell 50 may thus have a longer service life.

Figure 5:
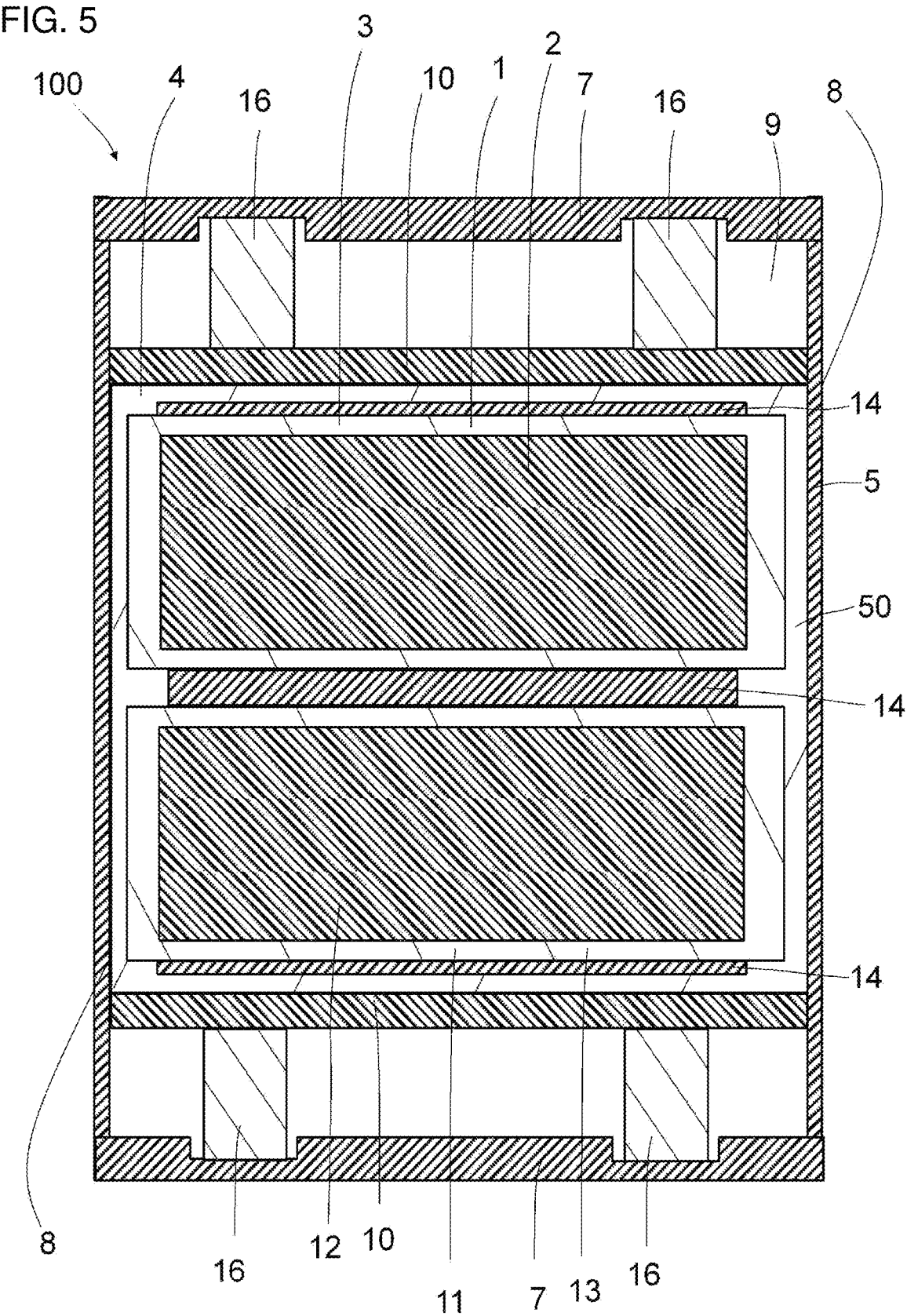
FIG. 5 is a cross-sectional view of still another electrochemical cell module corresponding to FIG. 2.

FIG. 5 is a cross-sectional view of still another electrochemical cell module corresponding to FIG. 2. As shown in FIG. 5, the liquid layer 14 may be located, for example, at least between the first casing 3 and the outer container 4 or between the second casing 13 and the outer container 4. In the example shown in FIG. 5, a liquid layer 14 is located between the first casing 3 and the second casing 13, and at a position opposite to the liquid layer 14 with the first electricity generator 2 between them, another liquid layer 14 is located between the first casing 3 and the outer container 4. A liquid layer 14 is located between the first casing 3 and the second casing 13, and at a position opposite to the liquid layer 14 with the second electricity generator 12 between them, another liquid layer 14 is located between the second casing 13 and the outer container 4. The first unit cell 1 and the second unit cell 11 may thus be less likely to be misaligned in the outer container 4. This reduces the likelihood of damage in the area of contact between the first terminals and the external terminals or between the second terminals and the external terminals. The electrochemical cell 50 is thus less likely to be damaged.

The liquid layer 14 may be formed from, for example, a material having a higher viscosity than the electrolyte used in the first electricity generator 2 and the second electricity generator 12. The first unit cell 1 and the second unit cell 11 may thus be less likely to be misaligned in the outer container 4. The electrochemical cell 50 is thus still less likely to be damaged.

Figure 6:
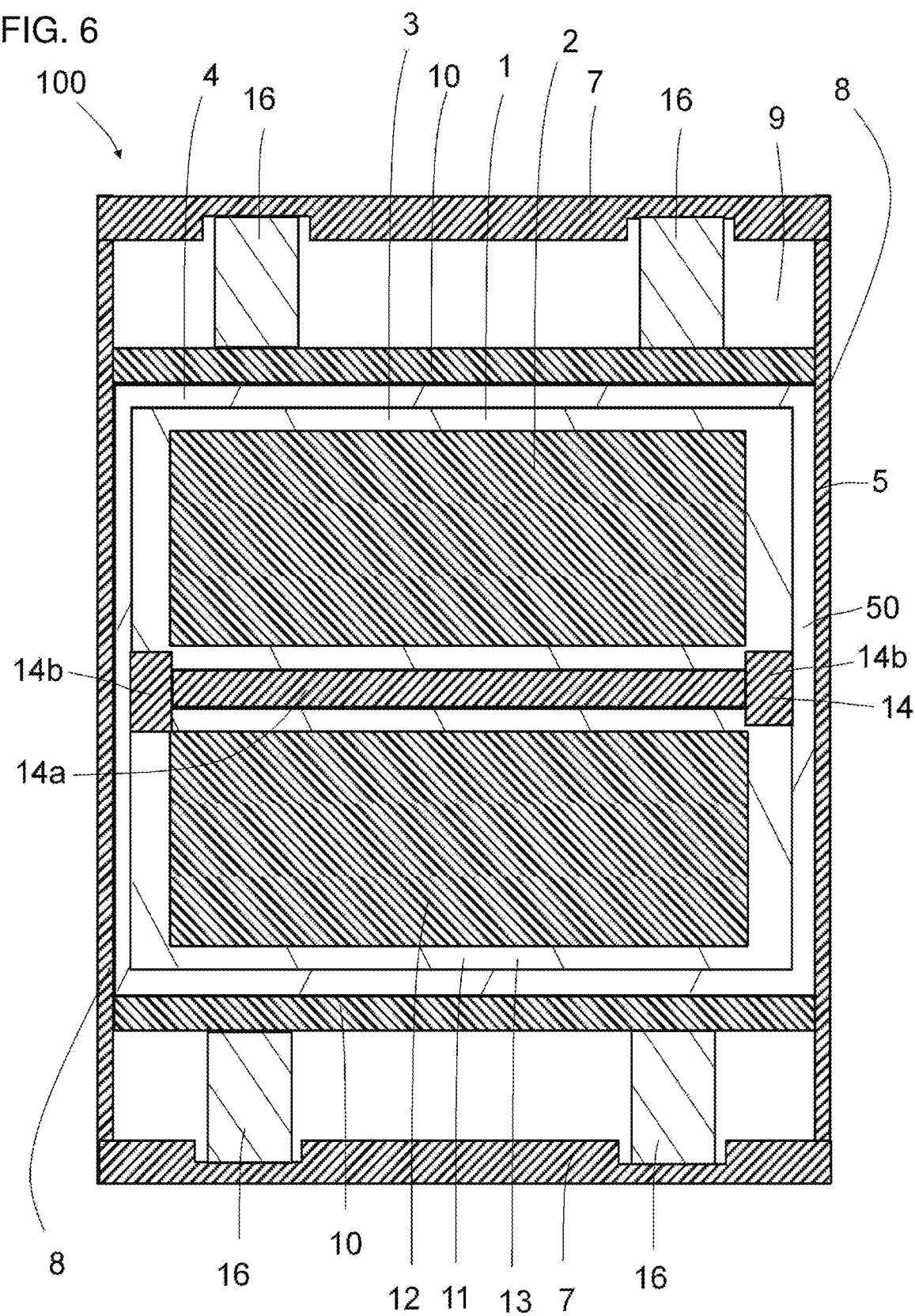
FIG. 6 is a cross-sectional view of still another electrochemical cell module corresponding to FIG. 2.

FIG. 6 is a cross-sectional view of still another electrochemical cell module corresponding to FIG. 2. As shown in FIG. 6, the liquid layer 14 may include, for example, a first liquid layer 14a and a second liquid layer 14b. The first liquid layer 14a may be located in an area of overlap between the first electricity generator 2 and the second electricity generator 12 as viewed in the stacking direction of the first unit cell 1 and the second unit cell 11. The second liquid layer 14b may be located in an area other than an area of overlap between the first electricity generator 2 and the second electricity generator 12. The second liquid layer 14b may be thicker than the first liquid layer 14a. The thicknesses of the first liquid layer 14a and the second liquid layer 14b are the dimensions in the stacking direction of the first unit cell 1 and the second unit cell 11. Such liquid layers reduce transmission of any external force applied perpendicularly in the stacking direction of the first unit cell 1 and the second unit cell 11. The electrochemical cell 50 is thus less likely to be damaged.

The thicknesses of the first liquid layer 14a and the second liquid layer 14b may be measured as described below. The electrochemical cell 50 is cooled to a low temperature below the freezing point of the first liquid layer 14a and the second liquid layer 14b to freeze the first liquid layer 14a and the second liquid layer 14b, and then is cut in a direction perpendicular to the main surfaces of the electrochemical cell 50. The cross-sectional surface is observed to determine the thicknesses. The thicknesses of the first liquid layer 14a and the second liquid layer 14b may also be ultrasonically measurable.

Figure 7:
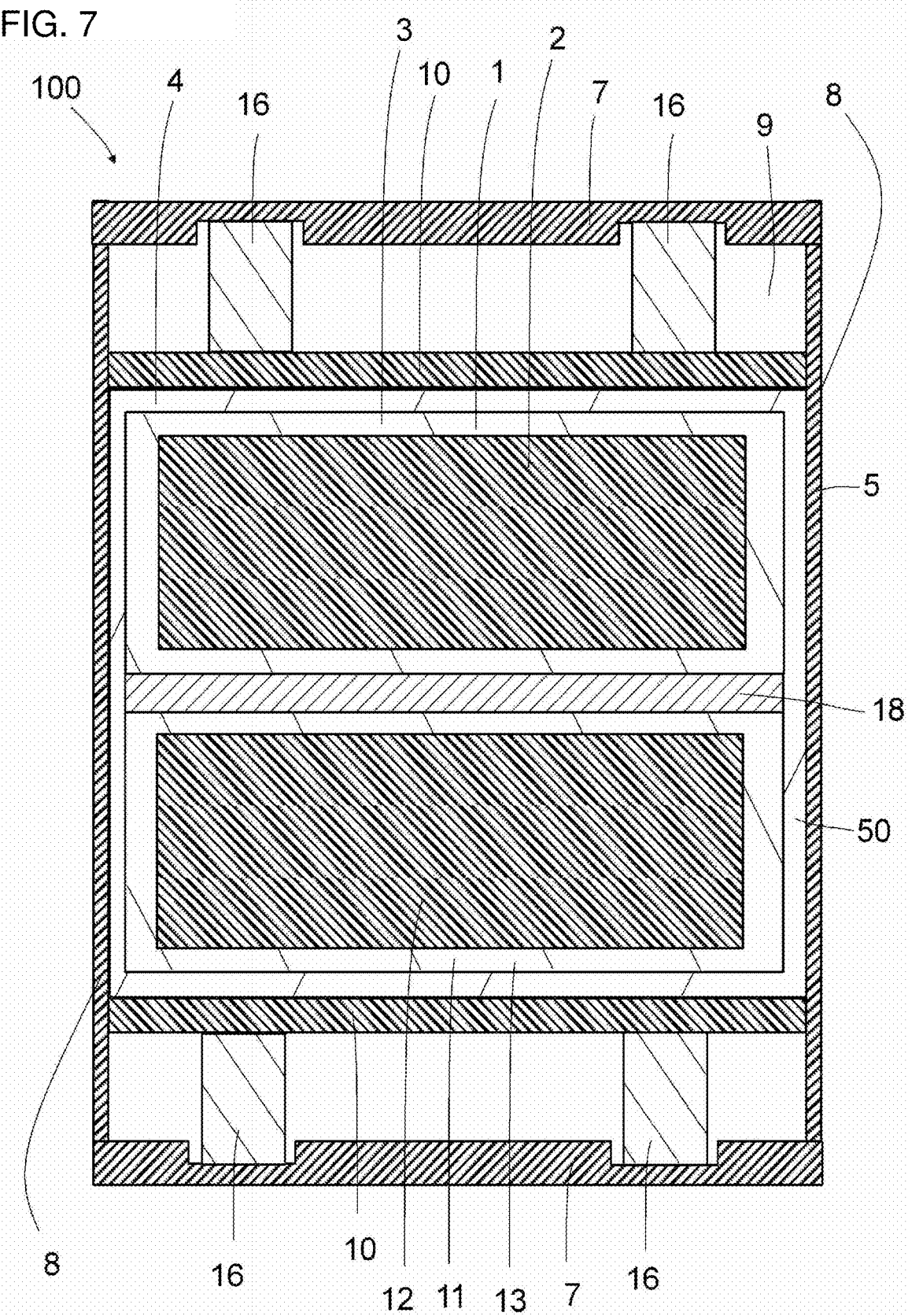
FIG. 7 is a cross-sectional view of another electrochemical cell module corresponding to FIG. 2.

Other embodiments of the present disclosure will now be described. FIG. 7 is a cross-sectional view of another electrochemical cell module corresponding to FIG. 2. In the present embodiment, as shown in FIG. 7, an electrolyte 18 is located between the first casing 3 and the second casing 13 instead of the liquid layer 14 described above. Similarly to the liquid layer 14, the electrolyte 18 can uniformly apply pressure to the first unit cell 1 and the second unit cell 11. The electrochemical cell 50 may thus be less likely to deteriorate. The electrolyte 18 is also located inside the first casing 3 and the second casing 13. The electrolyte 18 between the first casing 3 and the second casing 13 may be the same as the electrolyte included in the first electricity generator 2 and the second electricity generator 12.

Figure 8:
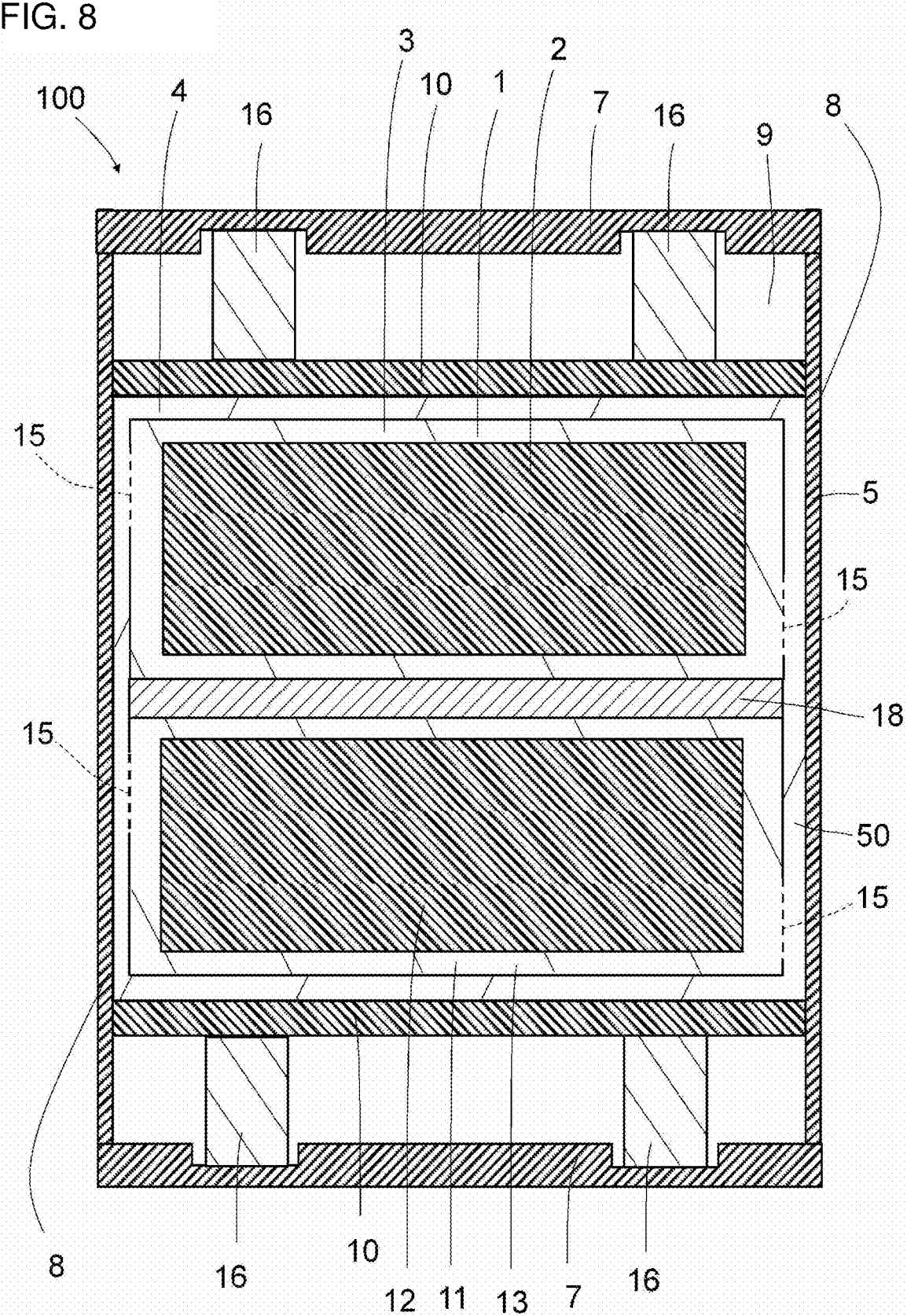
FIG. 8 is a cross-sectional view of still another electrochemical cell module corresponding to FIG. 2.

FIG. 8 is a cross-sectional view of still another electrochemical cell module corresponding to FIG. 2. As shown in FIG. 8, at least either the first casing 3 or the second casing 13 may include an opening 15. The opening 15 may be, for example, a cut in at least either the first casing 3 or the second casing 13. The opening 15 may also be, for example, a rectangular cut in at least either the first casing 3 or the second casing 13. The opening 15 may have, for example, a length of 10 to 200 mm and a width of 10 to 50 mm Repeated charging and discharging reactions in the first unit cell 1 or the second unit cell 11 may decrease the amount of the electrolyte in the first unit cell 1 or the second unit cell 11. In this case, the electrolyte 18 between the first casing 3 and the second casing 13 may enter the first casing 3 or the second casing 13 through the opening 15. This reduces the likelihood of the electrolyte in the first unit cell 1 or the second unit cell 11 being depleted. The electrochemical cell 50 may thus have a longer service life.

The opening 15 may be, as viewed perpendicularly in the stacking direction of the first unit cell 1 and the second unit cell 11, in an area other than an area of overlap between the first casing 3 and the first electricity generator 2, or in an area other than an area of overlap between the second casing 13 and the second electricity generator 12. This allows the electrolyte 18 between the first casing 3 and the second casing 13 to more easily enter the first unit cell 1 or the second unit cell 11. The electrochemical cell 50 may thus have a longer service life.

The housing 5 has a space for accommodating the electrochemical cell 50. The housing 5 protects the electrochemical cell 50 from the external environment. More specifically, the housing 5 protects the electrochemical cell 50 against an external force received from the external environment. The housing 5 is, for example, a box. The housing 5 may be formed by, for example, shaping a single member into a rectangular prism. The housing 5 may also include, for example, two or more members combined together.

The housing 5 includes, for example, a metal material. Such a housing 5 has higher rigidity and reduces transmission of any external force from the external environment to the electrochemical cell 50. The housing 5 thus protects the electrochemical cell 50 from the external environment. The metal material may be, for example, aluminum or stainless steel. This allows heat generated in the electrochemical cell 50 to easily transfer to the housing 5, thus improving heat dissipation. The electrochemical cell 50 may thus have a longer service life.

The housing 5 may include, for example, multiple parts. The housing 5 may include, for example, two main surface plates 7, two side plates 8, a bottom plate 9, and a terminal cover 6. More specifically, the housing 5 may be formed from a metal material and a resin material in combination.

The terminal cover 6 protects the external connection terminals of the electrochemical cell 50. The terminal cover 6 thus faces the external connection terminals of the electrochemical cell 50. The terminal cover 6 may be, for example, rectangular as viewed from the external connection terminals of the electrochemical cell 50. The terminal cover 6 may be formed from, for example, a resin material. More specifically, the resin material may be polyethylene terephthalate or polyethylene naphthalate. The rectangular bottom surface of the terminal cover 6 as viewed in the direction perpendicular to the surface including the terminals of the electrochemical cell 50 may have, for example, a length of 200 to 600 mm, a width of 50 to 300 mm, and a thickness of 0.1 to 5 mm. The rectangular side surfaces of the terminal cover 6 may have, for example, a length of 200 to 600 mm, a width of 50 to 300 mm, and a thickness of 0.1 to 5 mm.

The main surface plates 7 protect the main surfaces of the electrochemical cell 50. The main surface plates 7 thus face the main surfaces of the electrochemical cell 50. The main surfaces of the electrochemical cell 50 including the first unit cell 1 and the second unit cell 11 stacked on each other are the surfaces of the outer container 4 extending in a direction intersecting the stacking direction. The main surface plates 7 may be rectangular as viewed in the direction perpendicular to the main surfaces of the electrochemical cell 50. The main surface plates 7 may be formed from, for example, a metal material. More specifically, the metal material may be, for example, aluminum or stainless steel. Such main surface plates 7 easily transfer heat generated in the electrochemical cell 50 to the outside. The electrochemical cell 50 may thus have a longer service life.

The main surface plates 7 may be formed from, for example, a resin material. The resin material may be, for example, a heat-resistant resin material with a high melting point. The heat-resistant resin material may be, for example, polyethylene terephthalate (PET). Such main surface plates 7 can electrically insulate the electrochemical cell 50 from the external environment, thus reducing the likelihood of a short-circuit forming between the electrochemical cell 50 and the external environment. The rectangular main surface plates 7 as viewed in the direction perpendicular to the main surfaces of the electrochemical cell 50 may have, for example, a length of 200 to 600 mm, a width of 50 to 300 mm, and a thickness of 0.5 to 5 mm.

The side plates 8 protect the side surfaces of the electrochemical cell 50. The side plates 8 thus face the side surfaces of the electrochemical cell 50. The side plates 8 may also be, for example, in contact with the electrochemical cell 50. The side plates 8 may be, for example, rectangular as viewed in the direction perpendicular to the side surfaces of the electrochemical cell 50. The side plates 8 may be formed from, for example, a metal material. More specifically, the side plates 8 may be formed from, for example, aluminum or stainless steel. Such side plates 8 easily transfer heat generated in the electrochemical cell 50 to the outside. The electrochemical cell 50 may thus have a longer service life.

The side plates 8 may also be formed from, for example, a resin material. The resin material may be, for example, a heat-resistant resin material. The heat-resistant resin material may be, for example, PET. Such side plates 8 can electrically insulate the electrochemical cell 50 from the external environment, thus reducing the likelihood of a short-circuit forming between the electrochemical cell 50 and the external environment. The rectangular side plates 8 as viewed in the direction perpendicular to the side surfaces of the electrochemical cell 50 may have, for example, a length of 200 to 600 mm, a width of 50 to 300 mm, and a thickness of 0.5 to 5 mm.

The bottom plate 9 protects the surface of the electrochemical cell 50 opposite to the surface from which the external connection terminals protrude. The bottom plate 9 may thus be in contact with the surface of the electrochemical cell 50 opposite to the surface from which the external connection terminals protrude. The bottom plate 9 may be rectangular as viewed in the direction perpendicular to the surface opposite to the surface from which the external terminals protrude. The bottom plate 9 may be formed from, for example, a metal material. The metal material may be, for example, aluminum or stainless steel. Such a bottom plate 9 easily transfers heat generated in the electrochemical cell 50 to the outside. The battery may thus have a longer service life.

The bottom plate 9 may also be formed from, for example, a resin material. The resin material may be, for example, a heat-resistant resin material. The heat-resistant resin material may be, for example, PET. Such a bottom plate 9 can electrically insulate the electrochemical cell 50 from the external environment, thus reducing the likelihood of a short-circuit forming between the electrochemical cell 50 and the external environment. The bottom plate 9 may also be formed by, for example, bending a part of the side plate 8 or the main surface plate 7. The rectangular bottom plate 9 as viewed in the direction perpendicular to the surface of the electrochemical cell 50 opposite to the surface from which the external connection terminals protrude may have, for example, a length of 200 to 600 mm, a width of 50 to 300 mm, and a thickness of 0.5 to 5 mm.

In the examples described above, the electrochemical cell module 100 may include, for example, a pressurizing unit to apply pressure to the main surfaces of the first unit cell 1 and the second unit cell 11 through the outer container 4 in the housing 5. Such a pressurizing unit includes, for example, pressure plates 10 and elastic members. The first unit cell 1 and the second unit cell 11 may be pressed and held by, for example, the pressure plates 10 and the elastic members in the housing 5. To apply pressure to the electrochemical cell 50, the pressure plates 10 may be movably located between the main surface plates 7 and the electrochemical cell 50 in the housing 5.

The pressure plates 10 may be formed from, for example, a metal material. The metal material may be, for example, aluminum or stainless steel. Such pressure plates 10 easily transfer heat generated in the electrochemical cell 50 to the outside. The electrochemical cell 50 may thus have a longer service life.

The pressure plates 10 may also be formed from, for example, a resin material. The resin material may be, for example, a thermosetting resin. The thermosetting resin may be, for example, an epoxy resin, a phenolic resin, or a melamine resin. Such pressure plates 10 can electrically insulate the electrochemical cell 50 from the external environment, thus reducing the likelihood of a short-circuit forming between the electrochemical cell 50 and the external environment.

The pressure plates 10 may be formed from, for example, a resin material and a metal material. Each pressure plate 10 may include, for example, a portion in contact with the electrochemical cell 50 and formed from a resin material. Such a resin material can electrically insulate the electrochemical cell 50 from the pressure plates 10. This reduces the likelihood of a short-circuit forming between the electrochemical cell 50 and the external environment. The pressure plates 10 including a metal material may be less likely to be damaged.

Each elastic member is located between the pressure plate 10 and the main surface plate 7 in the housing 5. The elastic members apply pressure to the pressure plates 10 to apply pressure to the electrochemical cell 50. The elastic members may be, for example, springs 16. The springs 16 may be helical coil springs. The springs 16 may be, for example, leaf springs of bent plates. The springs 16 may be formed from, for example, a metal material. The metal material may be, for example, steel or stainless steel. The springs 16 may have, for example, a diameter of 5 to 50 mm, a length of 10 to 50 mm, and a pitch of 1 to 10 mm.

The elastic members may be formed from a rubber material. The rubber material may be, for example, plate-like. The rubber material may have, for example, the same shape as the pressure plate 10. The rubber material may include, for example, natural rubber. The rubber material may include, for example, synthetic rubber.

Figure 9:
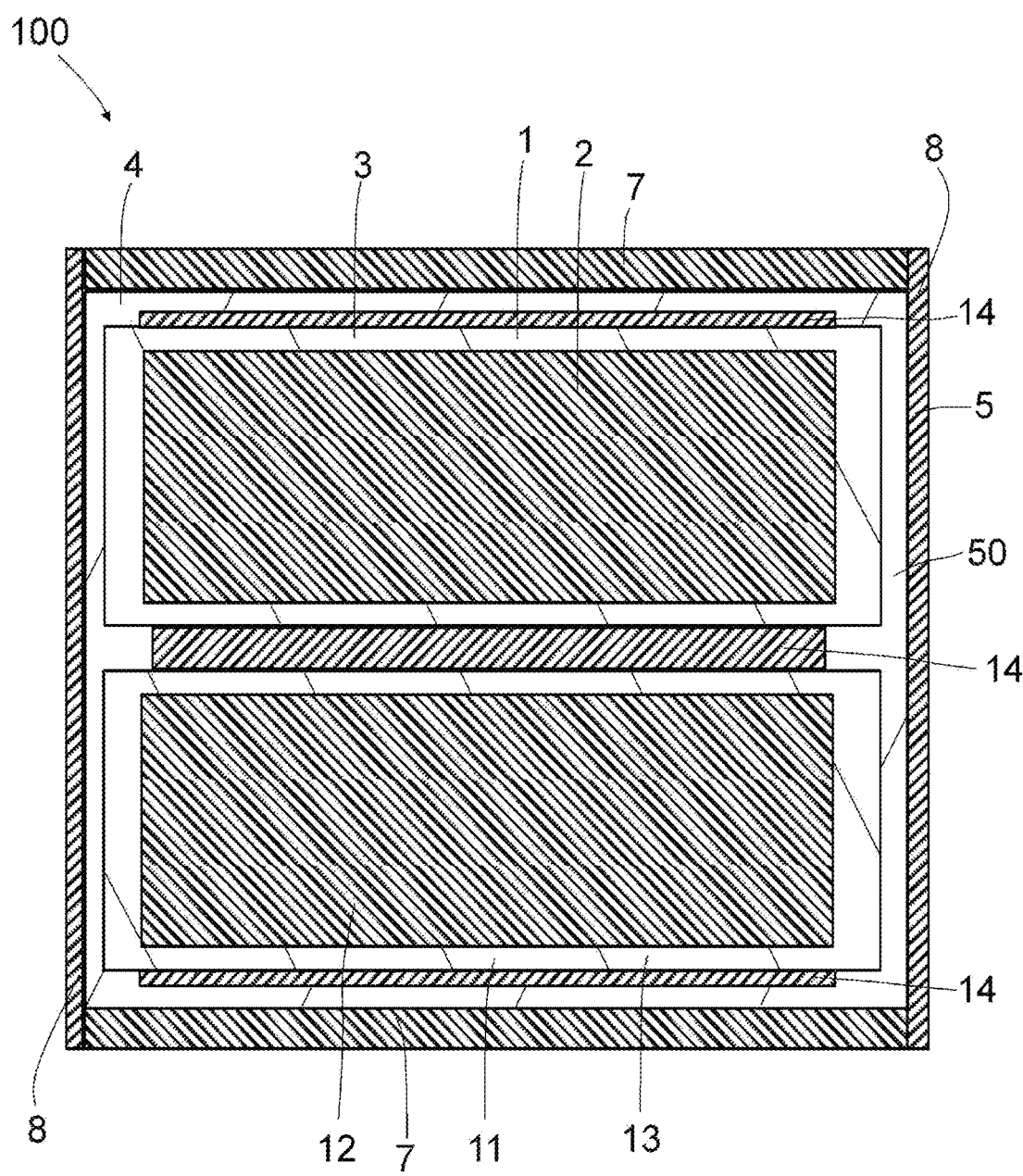
FIG. 9 is a cross-sectional view of still another electrochemical cell module corresponding to FIG. 2.

Without the pressurizing unit described above, the housing 5 may apply pressure to the main surfaces of the first unit cell 1 and the second unit cell 11 through the outer container 4. FIG. 9 is a cross-sectional view of still another electrochemical cell module corresponding to FIG. 2. As shown in FIG. 9, for example, the main surface plates 7 in the housing 5 may press the outer container 4 to apply pressure to the main surfaces of the first unit cell 1 and the second unit cell 11. In the housing 5, the main surface plates 7, for example, screwed to the side plates 8 may apply pressure to the main surfaces of the first unit cell 1 and the second unit cell 11.

For ease of explanation, FIGS. 1 to 9 show the unit cells, the electricity generators, the casings, or the terminals in the same shape having their outer peripheries aligned with each other. However, the shapes may be slightly different, with the outer peripheries slightly misaligned from each other. For example, the outer peripheries may be misaligned within the range of manufacturing errors. The housing 5 may accommodate, for example, a stack of two or more electrochemical cells 50, rather than the electrochemical cell 50 alone.

The present disclosure may be embodied in various forms without departing from the spirit or the main features of the present disclosure. The embodiments described above are thus merely illustrative in all respects. The scope of the present disclosure is defined not by the description given above but by the claims. Any modifications and alterations contained in the claims fall within the scope of the present invention.

The invention claimed is:

1. An electrochemical cell, comprising:
   a first unit cell including a first electricity generator and a first casing, the first casing containing the first electricity generator;
   a second unit cell including a second electricity generator and a second casing, the second casing containing the second electricity generator;
   an outer container containing the first unit cell and the second unit cell; and
   an electrolyte inside the first casing, inside the second casing, and between the first casing and the second casing.

2. The electrochemical cell according to claim 1, wherein at least one of the first casing or the second casing has an opening.

3. An electrochemical cell module, comprising:
   an electrochemical cell including:
      a first unit cell including a first electricity generator and a first casing, the first casing containing the first electricity generator;
      a second unit cell including a second electricity generator and a second casing, the second casing containing the second electricity generator;
      an outer container containing the first unit cell and the second unit cell; and
      an electrolyte inside the first casing, inside the second casing, and between the first casing and the second casing;
   a housing containing the electrochemical cell; and
   a pressurizing unit configured to apply pressure to the first unit cell and the second unit cell.

4. An electrochemical cell module, comprising:
   an electrochemical cell including:
      a first unit cell including a first electricity generator and a first casing, the first casing containing the first electricity generator;
      a second unit cell including a second electricity generator and a second casing, the second casing containing the second electricity generator;
      an outer container containing the first unit cell and the second unit cell; and
      an electrolyte inside the first casing, inside the second casing, and between the first casing and the second casing; and
   a housing containing the electrochemical cell,
   wherein the housing applies pressure to the first unit cell and the second unit cell.

* * * * *